(12) United States Patent
Datla et al.

(10) Patent No.: US 9,195,379 B2
(45) Date of Patent: Nov. 24, 2015

(54) AUTOMATED TECHNIQUES TO BOOTSTRAP A CONVERGED INFRASTRUCTURE (CI) BASED ON A CI PACKAGE DESIGN UNIT

(71) Applicant: Cisco Technology, Inc., San Jose, CA (US)

(72) Inventors: Raju Datla, Pleasanton, CA (US); Raju S V L N Penmetsa, San Jose, CA (US); Sung-Jin Lim, Fremont, CA (US); Parthasarathy Venkatavaradhan, Sunnyvale, CA (US); Ravikumar Pisupati, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 14/020,035

(22) Filed: Sep. 6, 2013

(65) Prior Publication Data

US 2014/0108988 A1    Apr. 17, 2014

Related U.S. Application Data

(60) Provisional application No. 61/714,851, filed on Oct. 17, 2012.

(51) Int. Cl.
*G06F 3/0484*      (2013.01)
*H04L 12/24*       (2006.01)

(52) U.S. Cl.
CPC ............ *G06F 3/0484* (2013.01); *H04L 41/022* (2013.01); *H04L 41/08* (2013.01)

(58) Field of Classification Search
CPC .................................................... G06F 3/0484
USPC ........................................................ 715/772
See application file for complete search history.

(56) References Cited

U.S. PATENT DOCUMENTS 9,015,297 B2 *   4/2015   Putman et al. ................. 709/223
9,083,625 B2 *   7/2015   Nandyalam et al. .................. 1/1
(Continued)

FOREIGN PATENT DOCUMENTS

WO       2014/022341 A1    2/2014

OTHER PUBLICATIONS

Scaramella, "HP Blade System Matrix: Delivering the Converged Infrastructure," IDC, White Paper, Jun. 2010, 11 pages.
(Continued)

*Primary Examiner* — Reza Nabi
(74) *Attorney, Agent, or Firm* — Edell, Shapiro & Finnan, LLC

(57) ABSTRACT

A technique to bootstrap a converged infrastructure design includes receiving a package specification unit (PU) representative of a design of a converged infrastructure (CI) including compute, storage, network, and virtualization components, the PU including component readable tasks that perform operations on the CI components. The PU further includes an inventory task model associated with tasks to read inventory information from the CI components, an assessment task model associated with tasks to assess the CI components, a configuration task model associated with tasks to configure the CI components, and a user input model to generate prompts to solicit and receive CI component information from a user, and provide the received information to the other PU models. The technique displays a PU model menu from which the PU models may be selected, and receives a selection of one of the PU models through the PU model menu. The technique executes one or more tasks associated with the selected PU model to perform corresponding operations on the CI components.

22 Claims, 10 Drawing Sheets

(56) References Cited

U.S. PATENT DOCUMENTS

| | | | |
|---|---|---|---|
| 2003/0177412 A1* | 9/2003 | Todd | 714/25 |
| 2003/0204592 A1* | 10/2003 | Crouse-Kemp et al. | 709/225 |
| 2006/0064619 A1* | 3/2006 | Wen et al. | 714/734 |
| 2006/0235831 A1* | 10/2006 | Adinolfi et al. | 707/3 |
| 2007/0168493 A1* | 7/2007 | Sarwono et al. | 709/224 |
| 2009/0049298 A1* | 2/2009 | Hatter et al. | 713/176 |
| 2010/0190142 A1* | 7/2010 | Gal et al. | 434/322 |
| 2012/0151036 A1* | 6/2012 | Detro et al. | 709/224 |
| 2012/0271937 A1* | 10/2012 | Cotten et al. | 709/224 |
| 2013/0036214 A1* | 2/2013 | Carmel et al. | 709/223 |
| 2013/0204918 A1* | 8/2013 | Ashok et al. | 709/201 |
| 2013/0232267 A1* | 9/2013 | Shatzkamer et al. | 709/226 |
| 2013/0263091 A1* | 10/2013 | Neogi | 717/126 |
| 2014/0040299 A1* | 2/2014 | Datla et al. | 707/758 |
| 2014/0059570 A1* | 2/2014 | Nandyalam et al. | 719/321 |
| 2014/0068022 A1* | 3/2014 | Kshirsagar et al. | 709/220 |
| 2014/0068599 A1* | 3/2014 | Kannan et al. | 718/1 |
| 2014/0108000 A1* | 4/2014 | Datla et al. | 703/21 |
| 2014/0108937 A1* | 4/2014 | Datla et al. | 715/735 |
| 2014/0108988 A1* | 4/2014 | Datla et al. | 715/772 |
| 2014/0109097 A1* | 4/2014 | Datla et al. | 718/102 |

OTHER PUBLICATIONS

UBM TechWeb, "Five Reasons to Make the Move to a Converged Infrastructure," A UBM TechWeb White Paper, Sep. 2012, 5 pages.

* cited by examiner

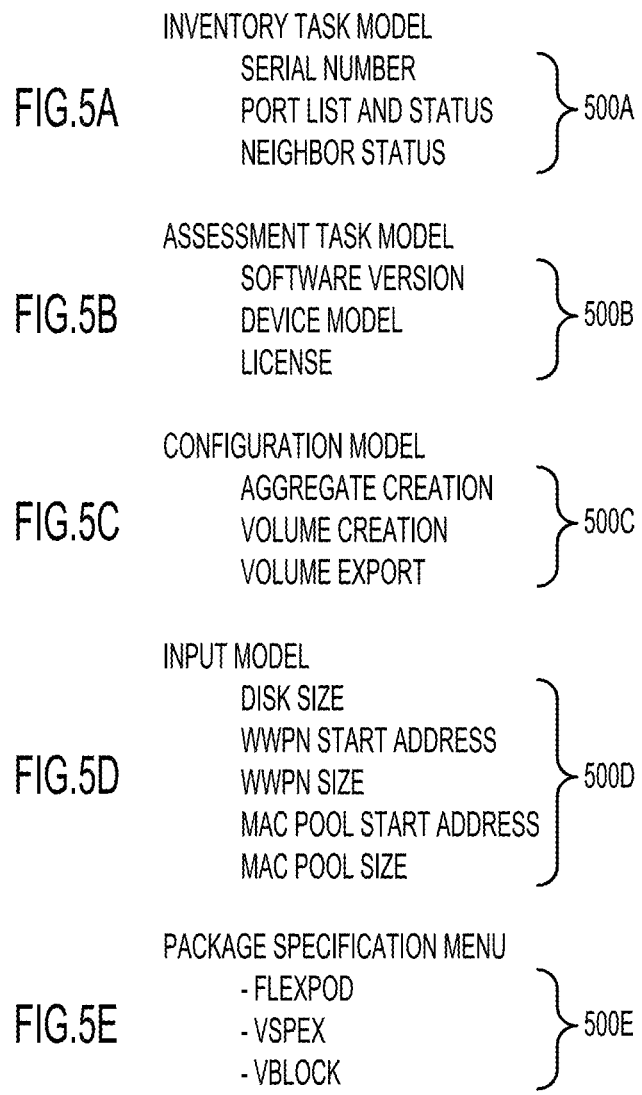

INVENTORY TASK DEFINITION 700

／—702
<task id="n5k-B-system-info" ref="query-network-device" label="System Info" >

704 { 
    <task-arg name="variable" value="DeviceInfo,NX-OS" />
    <task-arg name="parentElem" value="DeviceInfo" />
    <task-arg name="attrLst"
}

705 {
    value="Hostname,Model, Version,SerialNumber" />
    <returns name="Hostname,Model,Version,SerialNumber" type="table" />
}
　　　　　　　　　　　　　　　　　　　　　　　↖706
</task>

FIG.7

ASSESSMENT TASK DEFINITION 800

／— 802
<task id="n5k-B-model" ref="query-network-device" label="Device Model"
　　　　　　　　　　　expected-value="Nexus5XXX"　—806

820 {
    failure-impact="FlexPod provisioning may fail"
    failure-remedy="Replace this device with Nexus 5XXX model"
    failure-status:"critical" summary-report="true">
}

804 {
    <task-arg name="variable" value="DeviceInfo,NX-OS" />
    <task-arg name="parentElem" value="DeviceInfo" />
    <task-arg name="attrlist" value="Model" />
}
　　　　　　　　　　　　　　　　　　— 810
808 {
    <returns name="Model" type="table" />
    <validation name="nexusMode" param"Model" type="regexp"
    value="Nexus5[O-9]*" summary-report="true"/>
}
</task>

FIG.8

CONFIGURATION TASK DEFINITION 900

902

<task id="n5k-configure-interface-2" ref="n5k-configure-interface" label=Configure Description Eth1/2" />

904 { <task-arg name="name" value="Eth1/2" />
<task-arg name="description" value="${var_ntap_B_hostname}:e2a" />

</task>

FlexPod for VMware Deployment Model
FlexPod for VMware Overview
FlexPod for VMware Architecture
FlexPod for VMware Configuration Deployment
    Cabling Information
1110 —— NetApp FAS3210A Deployment Procedure--Part I
1112 —— Cisco Nexus 5548 Deployment Procedure--Part I
    Cisco Unified Computing System Deployment Procedure
    Gather Necessary Information
1116 { VMware ESXi Deployment Procedure
       VMware vCenter Server Deployment Procedure
    Cisco Nexus 1010 and 1000V Deployment Procedure
    NetApp Virtual Storage Console Deployment Procedure
1110 —— NetApp Operations Manager Deployment Procedure
Appendix--FlexPod for VMware Configuration Information
    Global, NetApp, Cisco, VMware Configuration Information
1110 —— NetApp FAS3200 Sample Configuration
    Filer Sample Interface Configuration
    Sample Startup Information Configuration
    Sample Volume Information
1112 —— Cisco Nexus 5548, 1010, 1000v Sample Running Configurations
    Cisco Unified Computing System Configuration Extracts
    Sample Chassis Discovery Policy Configuration
    Create an Organization
1112 { Create MAC Address Pools
       Create Global VLAN Pools
       Create a Network Control Policy
    Create vNIC Template
    Define QoS Policies and Jumbo Frames
    Create Uplink Port-Channels to the Cisco Nexus 5548 Switches
1112 { Create WWNN Pool
       Create WWPN Pools
       Create Global VSANs
    Create vHBA Templates
    Create Boot Policies
1114 —— Create Server Pools
    Create Service Profile Templates
    Add a Block of IP Addresses for KVM Access

FIG.11

AUTOMATED TECHNIQUES TO BOOTSTRAP A CONVERGED INFRASTRUCTURE (CI) BASED ON A CI PACKAGE DESIGN UNIT

CROSS-REFERENCE TO RELATED APPLICATION

This application claims the benefit of U.S. Provisional Application No. 61/714,851, filed Oct. 17, 2012, which is hereby incorporated by reference in its entirety.

TECHNICAL FIELD

The present disclosure relates to automated configuring of converged infrastructures.

BACKGROUND

A data center, cloud resource, or the like, may be implemented in the form of a converged infrastructure (CI). The CI is a set of integrated Information Technology (IT) components, such as storage, network, compute, and virtualization software and/or device components. Vendors of the various CI components typically provide validated design blueprints in the form of human readable specifications that define to a user extensive step-by-step manual procedures required to perform critical operations on the components. Such operations include provisioning (i.e., initially configuring or setting-up), reconfiguring/modifying, inventorying, and assessing/validating the CI components. Therefore, the user is required to step through painstaking manual procedures set forth in the blueprints to perform the critical operations. This is time consuming and burdensome for the user. Also, each of the CI components includes a vendor defined interface through which an external system may interact with and control the CI component, e.g., to perform the critical operations. Therefore, to accommodate the different interfaces, the user may require different external systems—one for each CI component—to perform the critical operations on the components. This increases complexity and cost associated with the critical operations.

BRIEF DESCRIPTION OF THE DRAWINGS

FIGS. 5A, 5B, 5C, and 5D depict example PU model menus that may be displayed in the operations of FIG. 4 responsive to corresponding PU model selections.

FIG. 5E depicts an example PU menu to display multiple different PUs corresponding to multiple CI blueprints.

FIGS. 7, 8, and 9 depict example model task definitions in respective ones of an inventory task model, an assessment task model, and a configuration task model of a PU.

FIG. 11 is an excerpt from an example human readable CI design blueprint for FlexPod™ from which a PU may be generated.

DESCRIPTION OF EXAMPLE EMBODIMENTS

Overview

Techniques to bootstrap a design or deployment of a converged infrastructure (CI) are presented herein. One technique includes receiving a package specification unit (PU) representative of a design of a converged infrastructure (CI) including compute, storage, network, and virtualization components, the PU including component readable tasks that perform operations on the CI components. The PU further includes an inventory task model associated with tasks to read inventory information from the CI components, an assessment task model associated with tasks to assess the CI components, a configuration task model associated with tasks to configure the CI components, and a user input model to generate prompts to solicit and receive CI component information from a user, and to provide the received information to the other PU models. The technique displays a PU model menu from which the PU models may be selected, and receives a selection of one of the PU models through the PU model menu. The technique executes one or more tasks associated with the selected PU model to perform corresponding operations on the CI components.

Example Embodiments

A converged infrastructure (CI) is a modular, integrated, often pre-configured or at least easily configured, set of information technology (IT) components, typically including storage, network, compute, and virtualization components, that may be shared across multiple user applications that require storage, network, and compute resources. Due to the modular nature of the CI, the CI components made available to the user applications may be scaled up and down relatively easily and efficiently in order to accommodate corresponding increases and decreases in user application resource requirements. Examples of known converged infrastructures (CIs) include, but are not limited to, FlexPod™ by NetApp and Cisco, VSPEX by EMC, and Vblock™ by VCE. Such known CIs are configured and operated in accordance with respective vendor CI specifications referred to herein as "blueprints" that have become quasi-industry standards.

Figure 1:
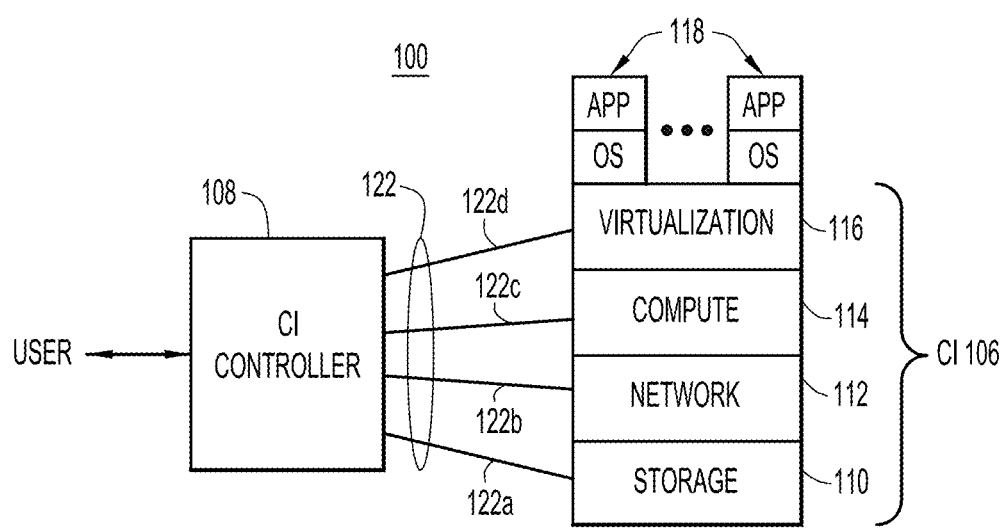
FIG. 1 is a block diagram of an example converged infrastructure environment in which a converged infrastructure (CI) is configured by and operates under control of a CI controller.

Referring first to FIG. 1, a block diagram of an example (CI) environment 100 is shown in which a CI 106 is configured by and operates under control of, a CI Controller 108. CI 106 includes an integrated set of components, including a storage component 110 to provide data storage, a network component 112 to provide connectivity to external devices and communication networks, a compute or server component 114 to provide processing capacity to the CI, and a virtualization component 116, such as a hypervisor, to host virtual environments. Virtualization component 116 may host multiple virtual user operating environments 118 on the stack of CI components 110, 112, and 114. Virtual user operating environments 118 may each include a virtualized operating system (OS), and one or more applications (APs) executing in the virtualized OS. Components 110, 112, and 114 provide respective data storage, network, and compute resources required by each OS and the respective one or more APs.

At a high-level, CI Controller 108 serves as a unified, automated, resource configured to manage CI 106. CI Controller 108 includes one or more Graphical User Interfaces (GUIs) through which a user may issue commands and provide data to the CI Controller to selectively cause the controller to perform operations with respect to CI 106, such as to provision, configure, assess/validate, and monitor the CI. As used herein, the "provision" operation may be considered an initial configure operation to configure the components of the CI for useful operation after the components have been unpacked and powered ON for the first time. Therefore, the terms "provision" and "configure" and their various forms are used interchangeably herein. Exemplary provision operations may establish storage volumes or partitions on storage component 110, establish virtual local area network (vlan) pools on network component 112, assign computing blades on compute component 114, and establish virtual resource pools on virtualization component 116.

CI Controller 108 manages CI 106 over a bi-directional communication interface 122, including component interfaces 122*a*, 122*b*, 122*c*, and 122*d* each to communicate directly with a respective one of storage, network, compute, and virtualization components 110, 112, 114, and 116. Component interfaces 122*a*-122*d* may support communications in accordance with any number of different protocols, including, for example, a network protocol such as the HyperText Transfer Protocol (HTTP). To the extent that components 110-116 of CI 106 support different interface protocols, such as a Rich Text or Extensible Markup Language (XML), component interfaces 122*a*-122*d* of CI Controller 108 correspondingly support the different protocols, and the CI Controller may be configured to communicate with components 110-116 using different protocols to maintain interface compatibility with the components as necessary.

As mentioned above, a specific design of CI 106 may be in accordance with a vendor blueprint. Because the blueprint complies with vendor specifications, the blueprint is said to represent or define a "validated" design of a CI. In one form, the blueprint is a human readable text- and graphics-based document that defines to a user manual step-by-step procedures and related information required to deploy, i.e., inventory, assess/validate, provision, and configure/reconfigure, each of the CI components in accordance with the specific design. An excerpt from an example blueprint for FlexPod™ is depicted in, and will be described briefly later in connection with, FIG. 11. The user may follow the manual procedures outlined in the blueprint to deploy CI 108; however, this is a manually intensive and time consuming activity.

The techniques presented herein advantageously automate and simplify the deployment of a CI for the user. Such automated deployment of the CI is referred to herein as "bootstrapping a CI." In brief, CI Controller 108 receives the blueprint as an input. In an a priori or offline/design phase before CI Controller 108 controls CI 106, the CI Controller automatically converts/translates the human readable procedures and related information of the received blueprint into interactive user menus and component instructions or tasks that control/interact directly with the CI components of CI 106. The tasks are "machine readable" instructions or commands formatted to conform to corresponding ones of CI component interface specifications so as to be understood by a CI component targeted by the command. CI Controller 108 compiles the tasks into a package specification unit (PU) (also referred to herein as a package unit (PU)) to which the CI Controller has access, or the tasks may be compiled into a library of tasks to which the PU has access on an as needed basis. Because the PU is generated from the blueprint, which represents a validated design, the PU also represents a validated design.

In a subsequent operational phase when CI Controller 108 controls CI 106, the user invokes/activates the PU on CI Controller 108. The tasks embedded in the PU or to which the PU has access interact directly with targeted ones of the CI components of CI 106 to configure and operate the CI components in accordance with the blueprint in an automated manner that no longer requires user access to the blueprint. The activated PU also includes and invokes an interactive user interface through which the user may control the PU to inventory, assess/validate, provision, and configure/reconfigure the CI components in a user controlled, automated manner. In other words, the PU executes the necessary component tasks embedded therein to automatically perform user requested operations on CI 106. In this way, the PU is said to be used to "bootstrap" CI 106, or bootstrap the deployment of CI 106.

Figure 2:
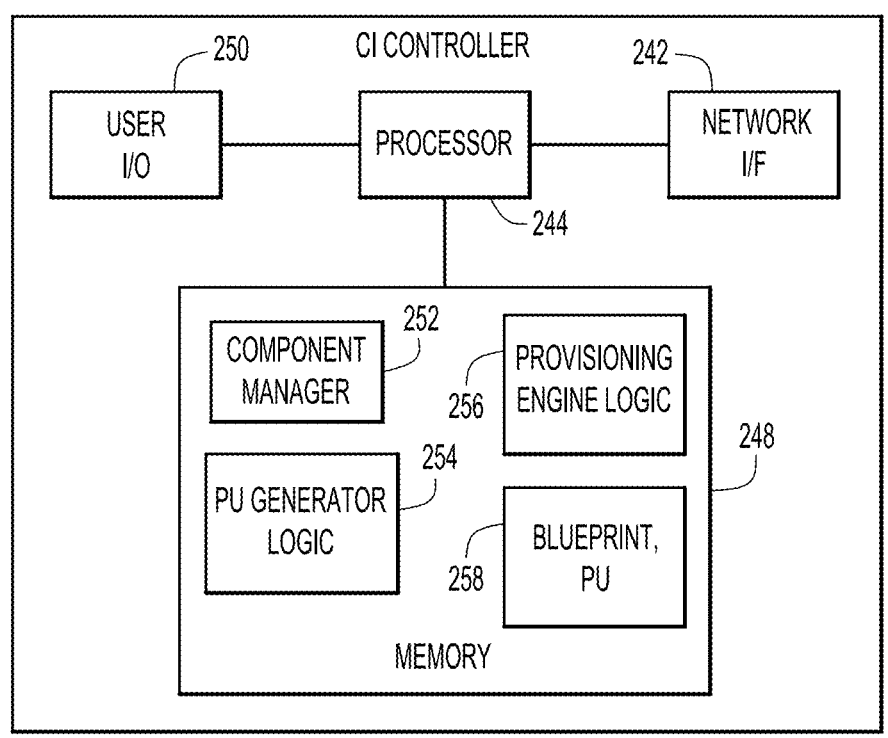
FIG. 2 is a block diagram of an example CI controller configured to perform management operations related to the CI from FIG. 1.

Reference is now made to FIG. 2, which shows an example block diagram of CI Controller 108 configured to perform the operations described herein, and particularly, to generate the PU based on the blueprint and then activate the PU to interact with CI 106. There are numerous possible configurations for CI Controller 108 and FIG. 2 is meant to be an example. CI Controller 108 includes a network interface unit 242, a processor 244, memory 248, and a user Input/Output module 250 used in association with the one or more GUIs to enable the user to interface with the CI Controller. The network interface (I/F) unit 242 is, for example, an Ethernet card device that allows the CI Controller 108 to communicate over a network, e.g., a wired (Ethernet) network. Network I/F 242 may also include wireless connection capability. Interface 122 (from FIG. 1) may be implemented through network I/F unit 242. The processor 244 is a microcontroller or microprocessor, for example, configured to execute software instructions stored in the memory 248.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 244) it is operable to perform the operations described herein. For example, the memory 248 stores or is encoded with instructions for Component Manager Logic 252 to perform generalized management operations on CI 106, PU Generator Logic 254 to generate a PU from a blueprint, and Provisioning Engine Logic 256 to activate the PU and cooperate with the PU to perform the inventory, assess/validate, provision, and configure/reconfigure operations mentioned above. In addition, the memory 248 includes a memory portion 258 to store one or more blueprints and associated Package Design Units (PUs). Memory portion 258 may also store a library of task definitions each including a specific task. The memory GUI logic may be divided among logic units 252, 254, and 256 as necessary to support the respective logic operations.

Figure 3:
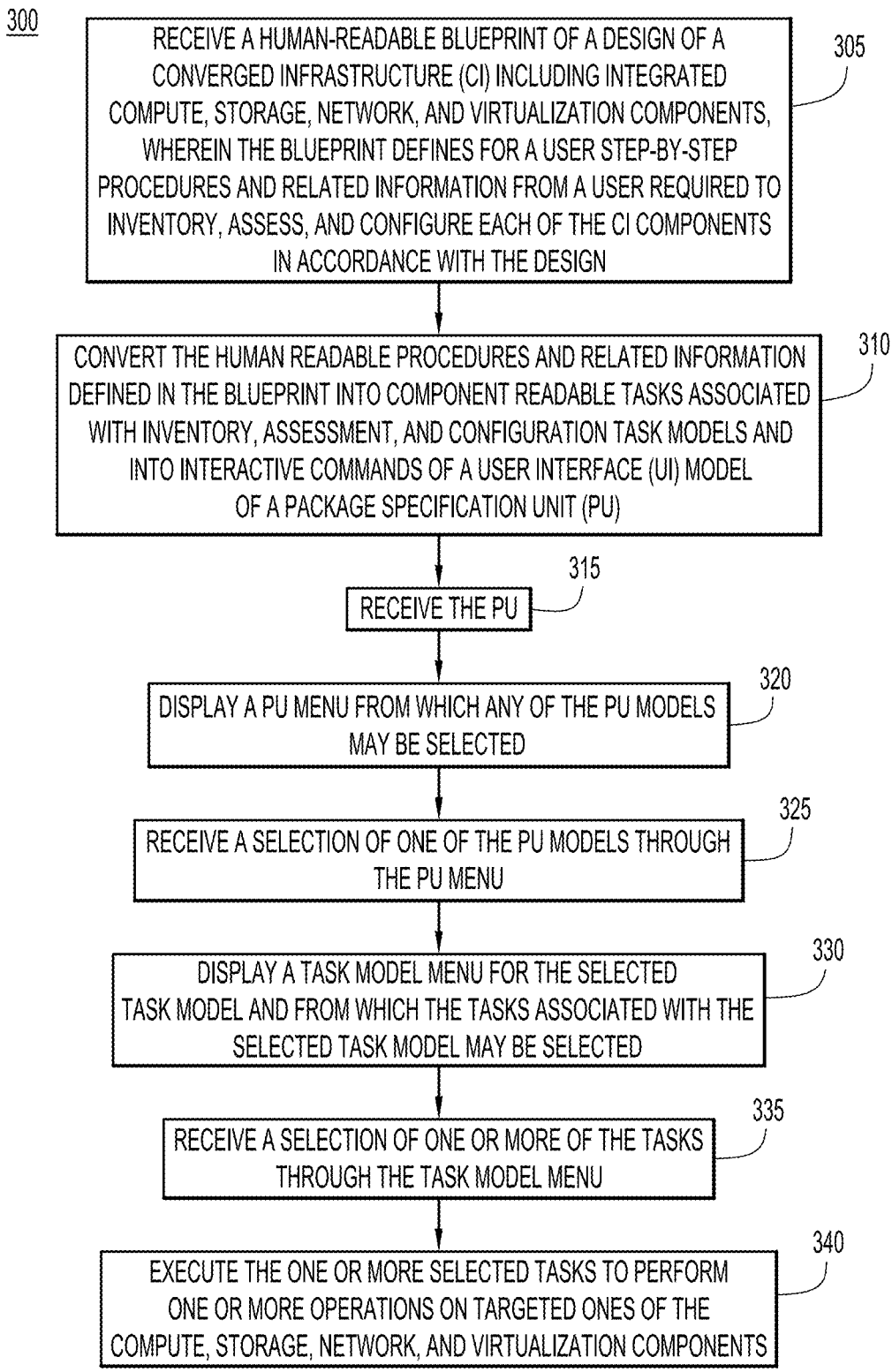
FIG. 3 is a flowchart of example high-level operations to generate a package specification unit or package unit (PU) from a CI blueprint and to activate and use the generated PU to inventory, assess, provision, and configure/reconfigure the CI of FIG. 1 under user control.

FIG. 3 shows a priori operations 305 and 310 performed by PU Generator logic 254 to generate a PU, and run-time operations 315-340 performed by Provisioning Engine logic 256 to activate the generated PU to interact with and control CI 106 under user control.

At 305, logic 254 receives a human-readable blueprint of a specific design of CI 106, including compute, storage, network, and virtualization components 110-116. The blueprint may be stored in memory 258. As mentioned above, the blueprint defines for a user step-by-step procedures and related information required to inventory, assess, and provision configure each of the CI components 110-116 in accordance with the design.

At 310, logic 254 converts the human readable procedures and related information defined in the blueprint into (i) displayable menus and component readable tasks associated with inventory, assessment, and configuration task models of a Package Specification Unit (PU), and (ii) displayable menus and interactive commands of a user interface (UI) model of the PU. The UI model may include the displayable menus associated with each of the task models. The inventory task model includes or has access to (i.e., is associated with) tasks to read inventory information from the CI components. The assessment task model is associated with tasks to assess/validate the CI components. The configuration task model is associated with tasks to configure the CI components. The user input model includes logic to generate prompts to solicit and receive CI component information from a user, and provide the received information to the other PU models. The PU and the PU models may be generated in formats including, but not limited to, Extensible Markup Language (XML), JavaScript Object Notation (JSON), and so on.

The PU generated at 310 may be loaded into memory 258 for access by subsequent runtime operations 315-340 described below. Operations 305-315 may be repeated for each of multiple CI blueprints to produce multiple corresponding PUs each for a corresponding validated CI design.

At 315, logic 256 receives the PU from memory 258 and activates, i.e., executes the PU. In an example, logic 256 displays a PU menu of different PUs available in memory 258 and from which the user may select and thereby activate one of the PUs. The term "menu" means any prompt or list of prompts displayed to the user and through which the user may make a selection or enter information.

Once the PU has been selected and activated at 315, Logic 256 interacts/cooperates with the models of that PU (i.e., the PU models) to perform subsequent operations described below.

At 320, a PU menu is displayed from which any of the PU models (i.e., the inventory task model, the assessment task model, and the configuration task model) of the activated PU may be selected by the user. The user may select one or more of the PU models.

At 325, a selection of one of the PU models is received from the user through the PU menu.

Assuming that the PU model selected at 325 was one of the inventory, assessment, and configuration task models, then at 330 a task model menu is displayed for the selected task model and from which the tasks is associated with the selected task model may be selected by an associate task identifier (ID) or name.

At 335, selections of one or more of the tasks are received from the user through the task model menu.

At 340, the one or more selected tasks are executed to perform one or more operations on targeted ones of the compute, storage, network, and virtualization components.

Returning to operation 325, if the PU model selected at 325 was the task that requires user inputs, then at 330 a UI menu is displayed based on the UI model to solicit information from the user. Information input by the user through the UI menu is provided to an appropriate one of the PU task models or to the PU generally.

Figure 4:
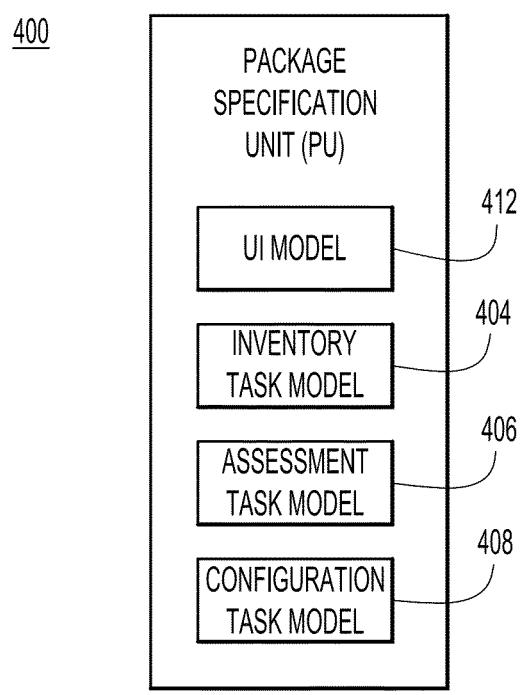
FIG. 4 a block diagram of an example PU generated by the operations of FIG. 3.

With reference to FIG. 4, a block diagram of an example PU 400 generated at operations 305-310 is shown. PU 400 includes: an Inventory Task Model 404 that is associated with inventory tasks to solicit and read component information from CI components 110-116; an Assessment Task Model 406 that is associated with assessment tasks to assess/validate the CI components; a Configuration Task Model 408 that is associated with configure tasks to configure the CI components; and a User Interface (UI) Model 412 that includes logic to generate display prompts or menus to solicit and receive CI component information from the user, and provide the received information to the other PU models as appropriate. UI Model 412 may also support modifications to a current configuration of CI 106. Display menus associated with each of the Task Models 404-408 (discussed below) may be included in the corresponding Task Models or in UI Model 412.

FIGS. 5A, 5B, 5C, and 5D depict example PU model menus (and associated model tasks) that may be displayed at operation 330 responsive to a corresponding PU model selection received at operation 325. FIGS. 5A-5D are now described also with reference to PU 400 of FIG. 4.

FIG. 5A is an illustration of an example inventory task menu 500A that may be displayed at operation 330. Menu 500A lists exemplary inventory tasks by corresponding task IDs (e.g., Serial Number, Port list and status, and Neighbor Status). Each of the task IDs is associated with an underlying inventory task in Inventory Task Model 404 of PU 400. When the user selects a given task by task ID from menu 500A, the associated underlying task is invoked, i.e., executed, to solicit the required information (e.g., Serial Number) from a targeted one of CI components 110-116.

FIG. 5B is an illustration of an example assessment task menu 500B that may be displayed at operation 330. Menu 500B lists exemplary assessment tasks by task ID (e.g., Software Version, Device Model, license). Each of the task IDs is associated with an underlying task in Assessment Task Model 406 of PU 400. When the user selects a given task by task ID from menu 500B, the associated underlying task is invoked to assess/validate a given aspect (e.g., Software Version) of a targeted one of CI components 110-116.

FIG. 5C is an illustration of an example configuration task menu 500C that may be displayed at operation 330. Menu 500C lists exemplary configuration tasks by task ID (e.g., Aggregate Creation, Volume Creation, Volume Export). Each of the task IDs is associated with an underlying task in Configuration Task Model 406 of PU 400. When the user selects a given task by name from menu 500C, the associated underlying task is invoked to configure a targeted one of CI components 110-116, e.g., to create a storage volume on storage component 110.

FIG. 5D is an illustration of an example UI model menu 500D that may be displayed at operation 330. Menu 500D lists exemplary information to be solicited from the user (e.g., Disk size, World Wide Port Name (WWPN) Start Address, Media Access Control (MAC) Pool size, etc.). When the user enters the prompted information, UI model 412 of PU 400 provides the entered information to the appropriate other model in the PU.

FIG. 5E is an illustration of an example PU menu 500E that may displayed at operation 315 assuming multiple different PUs corresponding to multiple CI blueprints have been generated and are available to logic 256. In the example, PUs corresponding to each of the following validated designs are available for selection: FlexPod™, VSPEX, and Vblock™.

Figure 6A:
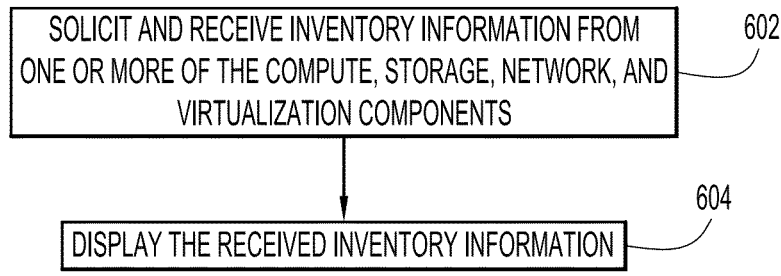
FIGS. 6A, 6B, and 6C each show one or more operations expanding on an operation in FIG. 3 in which selected PU model tasks are executed.
Figure 6B:
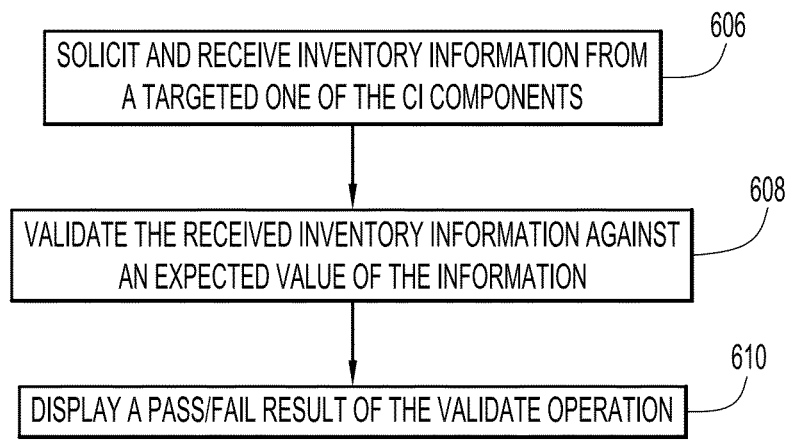
Figure 6C:
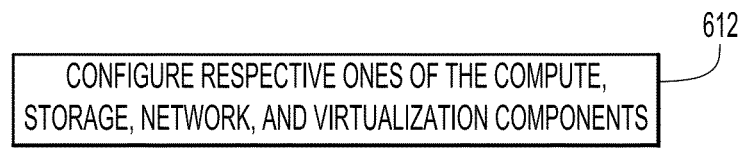

FIGS. 6A-6C each show one or more operations expanding on operation 340 in which selected PU model tasks are executed. FIGS. 6A-6C also show additional related display operations.

With reference to FIG. 6A, if one or more inventory tasks are selected at 335 through the inventory task model menu, then at 602 the selected inventory tasks are executed to solicit and receive inventory information from targeted ones of compute, storage, network, and virtualization components 110-116.

At 604, the received inventory information is displayed.

With reference to FIG. 6B, if an assessment task is selected at 335 through the assessment task model menu, then at 606 inventory information is solicited and received from a targeted one of CI components 110-116.

At 608, the received inventory information is validated against an expected value of the information.

At 610 a pass/fail result of the validate operation at 608 is displayed.

With reference to FIG. 6C, if one or more configuration tasks are selected at 335 through the configuration task model menu, then at 612 the selected tasks are executed to configure targeted ones of CI components 110-116.

FIGS. 7, 8, and 9 depict example task definitions 700, 800, and 900 associated with respective ones of Inventory Task Model 404, Assessment Task Model 406, and Configuration Task Model 408. Each of the models 404, 406, and 408 is typically associated with many such task definitions. The task definitions are generated at operation 310 of FIG. 3 when the human readable blueprint procedures and related information are converted into the tasks. Alternatively, the task definitions may preloaded in a task definition library in memory 258. Generally, each task definition includes (i) a human readable task (ID) to be displayed in a corresponding task model menu, (ii) one or more CI component readable commands (also referred to interchangeable as "task" or "tasks" above) associated with the task ID and each to perform a corresponding operation on a targeted component when the task is executed (i.e., when the task definition is called by its task ID), and (iii) one or more task arguments through which one or more component parameters are passed to the tasks/commands and to the targeted component when the task definition is called by its task ID to execute the embedded task. The necessary component parameters associated with a given task (of the task definition) may be solicited from the user before the task definition is called through a corresponding UI model menu (e.g., UI menu 500D in FIG. 5D), or when the task definition is called by name to executed its embedded task. The task definitions (task ID, tasks/commands/, and task arguments) may be generated in any number of different formats including, but not limited to, plain text, XML, JSON, and so on.

The tasks/commands in each task definition conform to a vendor command specification for the targeted CI component. For example, the syntax and structure of each command may follow a vendor defined data model for the targeted component. Because each command is formatted according to the corresponding vendor defined data model, each task/command is capable of being interpreted or understood by the targeted component. In contrast, the corresponding task ID is a functional, vendor-independent (i.e., abstracted), alpha-numeric ID that is easily understood by the user. Thus, the task ID is abstracted from the vendor command specification to a higher level that is understandable to a person.

Turning to FIG. 7, inventory task definition 700 includes a task identifier 702 "query-network-device," accepts three component parameters 704 (also referred to herein as arguments 704, and includes a task/command 705 that returns inventory information 706 (e.g., Hostname, Model, Version, SerialNumber) queried from the targeted CI component when the task/command is executed.

Turning to FIG. 8, assessment/validation task definition 800, identified at 802 as "query-network-device," validates a "Device Model" of network component 112. Task definition 800 accepts three arguments 804 and an expected value 806 for the Device Model. Task definition 800 includes a task/command 808 that queries network component 112 for its model, which is returned at 810 as "Model." Task definition 800 compares the returned model 810 against the expected value 806. If the compare indicates a mismatch, i.e., the compare failed, then the task reports/displays this failure status according to result descriptors 820. Alternatively, if there is no mismatch, i.e., the compare passes, then the task reports/displays the pass status.

Turning to FIG. 9, configuration task definition 900 identified at 902 accepts two arguments 904 and configures an Ethernet port of network component 112.

Figure 10:
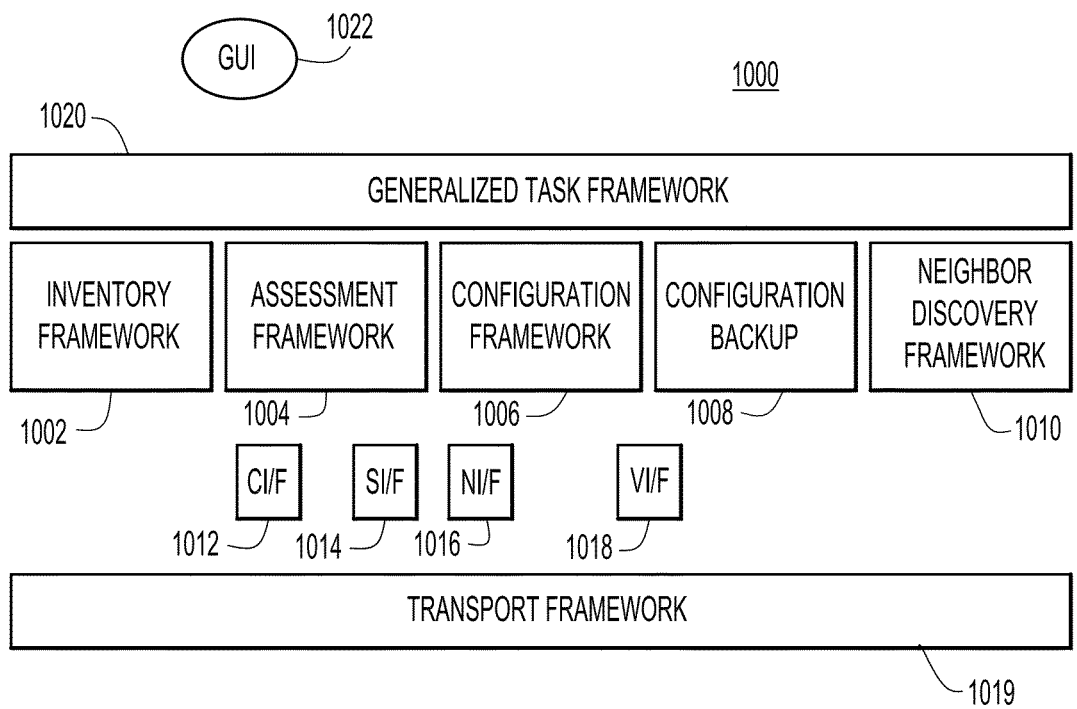
FIG. 10 is a block diagram of an example provisioning engine to support PU activation and use under user control.

FIG. 10 is a block diagram of an example configuration 1000 of Provisioning Engine logic 256. Configuration 1000 is also referred to herein as provisioning engine 1000. Provisioning engine 1000 provides a logical framework within which PU models 408-412 may operate when PU 400 is activated during runtime at operations 315-340 of FIG. 3, for example. Configuration engine 1000 includes an inventory framework 1002, an assessment framework 1004, a configuration framework 1006, and a configuration backup 1008 to host and interact respectively with Inventory Task Model 404, Assessment Task Model 406, Configuration Task Model 408, and UI Model 412 of PU 400. Provisioning engine 1000 also includes a neighbor discover framework 1010.

Provisioning engine 1000 includes component/device communication drivers C I/F 1012, S I/F 1014, N I/F 1016, and V I/F 1018 to support communications (of the PU model tasks) respectively with compute component 114, storage component 110, network component 112, and virtualization component 116 through a transport framework 1019. Provisioning engine 1000 also includes a generalized framework 1020 through which the various PU models hosted in the corresponding frameworks may inter-communicate, and a GUI 1022 to support PU model interaction with the user as described above.

FIG. 11 is an excerpt from an example human readable CI design blueprint 1100 for FlexPod™ from which a PU may be generated. The excerpt includes a sequence of line items that together form an outline or table of contents for the blueprint. That is, each line item listed is associated with further descriptive text and graphics of the blueprint not shown in FIG. 11. Collectively, the line items listed in FIG. 11 and the associated further description provide information on how to configure the storage, network, compute, and virtualization components in accordance with a validated design represented by the blueprint.

The process to convert the blueprint to a PU, i.e., to generate the PU from the blueprint, receives the blueprint as an input. The process also receives vendor provided interface data models, i.e., specifications, for each of the storage, network, compute, and virtualization components of the CI. The interface data models define task definitions with tasks/commands to interact with and perform operations on targeted ones of the CI components.

In an initial operation, the generate-PU-process associates each of the line items in blueprint 1100 and its associated underlying description with a corresponding one of the CI components and, correspondingly, with the data model for that CI component. As an example, the PU generate process associates: (i) storage-related line items 1110 (and the associated underlying description) with the CI storage component (e.g., storage component 110 of CI 106), and correspondingly with the storage component interface data model; (ii) network related line items 1112 with the CI network component (e.g., network component 112) and its related data model; (iii) compute line items 1114 with the CI compute component and its related data model; and (iv) virtualization related line items 1116 with the CI virtualization component and its related data model.

As just mentioned, the initial operation associates the line items of the blueprint with appropriate corresponding component data models. A result is that the line items are now correspondingly mapped to the vendor defined task definitions available in the associated data models.

In a next operation, the PU-generate-process maps each of the line items to one or more of inventory, assess, and provision/configure activities based on the subject matter addressed by the line item and its underlying description. After this operation, the task definitions already associated with the line items are now correspondingly associated with the one or more activities.

In a next operation, the PU-generate-process creates and populates inventory, assess, and provision/configure task models of the PU currently being generated with the corresponding mapped task definitions (as determined in the previous operation). A UI model is also created and includes menus to solicit necessary information from a user as indicated in the blueprint.

In a next operation, the PU-generate-process generates display menus associated with each of the models. The menus, when invoked, display the tasks definitions (by task ID) associated with the task models. The PU-generate-process may populate the corresponding task models with the display menus or may populate the UI model with the menus.

As described herein, an automated technique is provided to bootstrap a design of a CI in accordance with a validated CI blueprint. The technique uses a PU generated from a human readable blueprint. The PU includes interactive menus and CI component tasks to perform important activities with respect to the CI, such as inventory, assess, and provision/configure the CI. When activated, the PU provides menus to a user through which the user may select different tasks to interact with and control the CI. The user may setup the CI when it is powered ON for the first time based on the menus. This provides the user with an efficient, automated mechanism to perform the above-mentioned activities without requiring access to the blueprint.

In summary, in one form, a method is provided, comprising A method, comprising: receiving a package specification unit (PU) representative of a design of a converged infrastructure (CI) including compute, storage, network, and virtualization components, the package specification unit including component readable tasks that perform operations on the CI components, the package specification unit further including: an inventory task model associated with tasks to read inventory information from the CI components; an assessment task model associated with tasks to assess the CI components; a configuration task model associated with tasks to configure the CI components; and a user input model to generate prompts to solicit and receive CI component information from a user, and provide the received information to the other package specification unit models; displaying a package specification unit model menu from which the package specification unit models may be selected; receiving a selection of one of the package specification unit models through the package specification unit model menu; and executing one or more tasks associated with the selected package specification unit model to perform corresponding operations on the CI components.

In another form, an apparatus is provided, comprising: a network interface unit configured to send and receive communications over a network; and a processor coupled to the network interface unit, and configured to: receiving a package specification unit (PU) representative of a design of a converged infrastructure (CI) including compute, storage, network, and virtualization components, the package specification unit including component readable tasks that perform operations on the CI components, the package specification unit further including: an inventory task model associated with tasks to read inventory information from the CI components; an assessment task model associated with tasks to assess the CI components; a configuration task model associated with tasks to configure the CI components; and a user input model to generate prompts to solicit and receive CI component information from a user, and provide the received information to the other package specification unit models; display a package specification unit model menu from which the package specification unit models may be selected; receive a selection of one of the package specification unit models through the package specification unit model menu; and execute one or more tasks associated with the selected package specification unit model to perform corresponding operations on the CI components.

In still another form, a processor readable medium is provided for storing instructions that, when executed by a processor, cause the processor to: receive a package specification unit (PU) representative of a design of a converged infrastructure (CI) including compute, storage, network, and virtualization components, the package specification unit including component readable tasks that perform operations on the CI components, the package specification unit further including: an inventory task model associated with tasks to read inventory information from the CI components; an assessment task model associated with tasks to assess the CI components; a configuration task model associated with tasks to configure the CI components; and a user input model to generate prompts to solicit and receive CI component information from a user, and provide the received information to the other package specification unit models; display a package specification unit model menu from which the package specification unit models may be selected; receive a selection of one of the package specification unit models through the package specification unit model menu; and execute one or more tasks associated with the selected package specification unit model to perform corresponding operations on the CI components.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
receiving a package specification unit (PU) representative of a design of a converged infrastructure (CI) including compute, storage, network, and virtualization components, the package specification unit including compiled component readable tasks that perform operations on the CI components, the package specification unit further including:
an inventory task model associated with tasks to read inventory information from the CI components;

an assessment task model associated with tasks to assess the CI components;
a configuration task model associated with tasks to configure the CI components; and
a user input model to generate prompts to solicit and receive CI component information from a user, and provide the received information to the other package specification unit models;
displaying a package specification unit model menu from which the package specification unit models may be selected;
receiving a selection of one of the package specification unit models through the package specification unit model menu; and
executing one or more tasks associated with the selected package specification unit model to perform corresponding operations on the CI components.

2. The method of claim 1, wherein the receiving a selection includes receiving a selection of one of the inventory, assessment, and configuration task models, and the method further comprises:
displaying a task model menu for the selected task model and from which the tasks associated with the selected task model may be selected;
receiving a selection of one or more of the associated tasks through the task model menu, wherein the executing includes executing the one or more selected tasks to perform one or more operations on targeted ones of the compute, storage, network, and virtualization components.

3. The method of claim 2, wherein each task is part of corresponding task definition that includes:
a human readable task identifier (ID);
the task represented as one or more component readable commands each to perform a corresponding operation on a targeted component when the task is executed; and
one or more task arguments through which one or more component configuration parameters are passed to the commands and to the targeted component when the task is executed,
wherein:
the displaying a task model menu includes displaying task IDs of tasks associated with the selected task model; and
the executing includes providing commands of the one or more executed tasks to the targeted CI components.

4. The method of claim 1, wherein the selected task model is the inventory task model and the executing includes executing one or more tasks associated with the inventory task model to solicit and receive inventory information from one or more of the compute, storage, network, and virtualization components, the method further comprising displaying the received inventory information.

5. The method of claim 1, wherein the selected task model is the assessment task model and the executing includes executing a task associated with the assessment task model, the executing further including:
soliciting and receiving inventory information from a targeted one of the CI components; and
validating the received inventory information against an expected value of the information,
wherein the method further comprises displaying a pass/fail result of the validating.

6. The method of claim 1, wherein the selected task model is the configuration task model, and the executing includes executing tasks associated with the configure task model to configure respective ones of compute, storage, network, and virtualization components.

7. The method of claim 1, further comprising generating the PU, the generating comprising:
receiving a human-readable blueprint of the design of the CI that defines for a user step-by-step procedures and related information from the user required to inventory, assess, and configure each of the compute, storage, network, and virtualization components of the CI in accordance with the design; and
converting the procedures and related information defined in the blueprint to:
displayable menus and component readable tasks for each of the inventory,
assessment, and configuration task models of the PU; and
a displayable menu and interactive commands of the user interface model.

8. The method of claim 1, further comprising:
displaying a PU menu listing multiple available PUs and from which one of the listed PUs may be selected; and
receiving a selection of the PU through the PU menu.

9. An apparatus comprising:
a network interface unit configured to send and receive communications over a network; and
a processor coupled to the network interface unit, and configured to:
receiving a package specification unit (PU) representative of a design of a converged infrastructure (CI) including compute, storage, network, and virtualization components, the package specification unit including compiled component readable tasks that perform operations on the CI components, the package specification unit further including:
an inventory task model associated with tasks to read inventory information from the CI components;
an assessment task model associated with tasks to assess the CI components;
a configuration task model associated with tasks to configure the CI components; and
a user input model to generate prompts to solicit and receive CI component information from a user, and provide the received information to the other package specification unit models;
display a package specification unit model menu from which the package specification unit models may be selected;
receive a selection of one of the package specification unit models through the package specification unit model menu; and
execute one or more tasks associated with the selected package specification unit model to perform corresponding operations on the CI components.

10. The apparatus of claim 9, wherein the processor is further configured to receive a selection of one of the inventory, assessment, and configuration task models, and the processor is further configure to:
display a task model menu for the selected task model and from which the tasks associated with the selected task model may be selected;
receive a selection of one or more of the associated tasks through the task model menu,
execute the one or more selected tasks to perform one or more operations on targeted ones of the compute, storage, network, and virtualization components.

11. The apparatus of claim 10, wherein each task is part of corresponding task definition that includes:
a human readable task identifier (ID);
the task represented as one or more component readable commands each to perform a corresponding operation on a targeted component when the task is executed; and
one or more task arguments through which one or more component configuration parameters are passed to the commands and to the targeted component when the task is executed,
wherein the processor is configured to display a task model menu is further configured to display task IDs of tasks associated with the selected task model, and provide commands of the one or more executed tasks to the targeted CI components.

12. The apparatus of claim 9, wherein the selected task model is the inventory task model and the processor is configured to execute one or more tasks associated with the inventory task model to solicit and receive inventory information from one or more of the compute, storage, network, and virtualization components, and to display the received inventory information.

13. The apparatus of claim 9, wherein the selected task model is the assessment task model and the processor is configured to execute a task associated with the assessment task model, and to:
solicit and receiving inventory information from a targeted one of the CI components; and
validate the received inventory information against an expected value of the information, and
display a pass/fail result of the validate operation.

14. The apparatus of claim 9, wherein the selected task model is the configuration task model, and the processor is configured to execute tasks associated with the configure task model to configure respective ones of compute, storage, network, and virtualization components.

15. The apparatus of claim 9, wherein the processor is further configured to generate the PU by:
receiving a human-readable blueprint of the design of the CI that defines for a user step-by-step procedures and related information from the user required to inventory, assess, and configure each of the compute, storage, network, and virtualization components of the CI in accordance with the design; and
converting the procedures and related information defined in the blueprint to:
displayable menus and component readable tasks for each of the inventory,
assessment, and configuration task models of the PU; and
a displayable menu and interactive commands of the user interface model.

16. A processor readable non-transitory medium storing instructions that, when executed by a processor, cause the processor to:
receive a package specification unit (PU) representative of a design of a converged infrastructure (CI) including compute, storage, network, and virtualization components, the package specification unit including compiled component readable tasks that perform operations on the CI components, the package specification unit further including:
an inventory task model associated with tasks to read inventory information from the CI components;
an assessment task model associated with tasks to assess the CI components;
a configuration task model associated with tasks to configure the CI components; and
a user input model to generate prompts to solicit and receive CI component information from a user, and provide the received information to the other package specification unit models;
display a package specification unit model menu from which the package specification unit models may be selected;
receive a selection of one of the package specification unit models through the package specification unit model menu; and
execute one or more tasks associated with the selected package specification unit model to perform corresponding operations on the CI components.

17. The processor readable medium of claim 16, wherein the instructions to receive a selection include instructions to receive a selection of one of the inventory, assessment, and configuration task models, and the processor readable medium further comprises instructions to cause the processor to:
display a task model menu for the selected task model and from which the tasks associated with the selected task model may be selected;
receive a selection of one or more of the associated tasks through the task model menu,
wherein the instructions to cause the processor to execute include instructions to cause the processor to execute the one or more selected tasks to perform one or more operations on targeted ones of the compute, storage, network, and virtualization components.

18. The processor readable medium of claim 17, wherein each task is part of corresponding task definition that includes:
a human readable task identifier (ID);
the task represented as one or more component readable commands each to perform a corresponding operation on a targeted component when the task is executed; and
one or more task arguments through which one or more component configuration parameters are passed to the commands and to the targeted component when the task is executed, wherein:
the instructions to cause the processor to display a task model menu include instructions to cause the processor to display task IDs of tasks included in the selected task model; and
the instructions to cause the processor to execute include instructions to cause the processor to provide commands of the one or more executed tasks to the targeted CI components.

19. The processor readable medium of claim 16, wherein the selected task model is the inventory task model and the instructions to cause the processor to execute include instructions to cause the processor to execute one or more tasks associated with the inventory task model to solicit and receive inventory information from one or more of the compute, storage, network, and virtualization components, the processor readable medium further comprising displaying the received inventory information.

20. The processor readable medium of claim 16, wherein the selected task model is the assessment task model and the instructions to cause the processor to execute include instructions to cause the processor to execute a task associated with the assessment task model, and the instruction include further instructions to cause the processor to:
solicit and receiving inventory information from a targeted one of the CI components; and
validate the received inventory information against an expected value of the information, wherein the processor readable medium further includes instructions to cause the processor to display a pass/fail result of the validating.

21. The processor readable medium of claim 16, wherein the selected task model is the configuration task model, and the processor to cause the processor to execute includes further instructions to cause the processor to execute tasks associated with the configure task model to configure respective ones of compute, storage, network, and virtualization components.

22. The processor readable medium of claim 16, further comprising instructions to cause the processor to generate the PU, the instructions to generate including instructions to cause the processor to:
- receive a human-readable blueprint of the design of the CI that defines for a user step-by-step procedures and related information from the user required to inventory, assess, and configure each of the compute, storage, network, and virtualization components of the CI in accordance with the design; and
- convert the procedures and related information defined in the blueprint to:
- displayable menus and component readable tasks for each of the inventory,
- assessment, and configuration task models of the PU; and
- a displayable menu and interactive commands of the user interface model.

\* \* \* \* \*